United States Patent Office 3,356,688
Patented Dec. 5, 1967

3,356,688
PESTICIDAL HALOCYCLOPENTADIENE ADDUCTS
Victor Mark, Norristown, Pa., assignor to Monsanto Company, St. Louis, Mo., a corporation of Delaware
No Drawing. Continuation of application Ser. No. 329,915, Dec. 11, 1963. This application Nov. 14, 1966, Ser. No. 594,267
13 Claims. (Cl. 260—332.5)

ABSTRACT OF THE DISCLOSURE

Compounds, having insecticidal activity and low mammalian toxicity, of the formula:

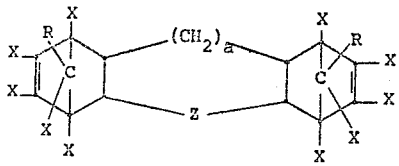

wherein R is selected from the group consisting of alkyl, alkenyl, oxaalkyl and chloroalkyl; Z is selected from the group consisting of —O—, —S—, and —(CH$_2$)$_b$—; X is halogen; $a$ is an integer from zero to three and $b$ is an integer from one to three.

---

This application is a continuation application of my application Serial Number 329,915, filed December 11, 1963, now abandoned, which in turn is a continuation-in-part application of my application Serial Number 132,570, filed August 21, 1961, now abandoned, which in turn is a continuation-in-part of my application Serial Number 44,890, filed July 25, 1960.

This invention relates to new chemical compounds and to methods of their synthesis. More specifically, the invention is directed to new Diels-Alder type adducts of unusual value. The preparation involves the adduction of substituted halocyclopentadienes and certain types of olefins.

It is well known that hexachlorocyclopentadiene can be reacted with olefins to form adducts which are toxic to living organisms. Although many of these are very toxic to most insects, they are dangerous to use because of their mammalian toxicity. In the use of these compounds, insect toxicity is frequently sacrificed in favor of safety to operating personnel.

It is a fundamental purpose of this invention to provide new biological toxicants with greatly reduced mammalian toxicity, but without serious loss of toxicity to microorganisms. A further purpose is to make available active insecticides, fungicides and herbicides which are relatively safe to use. Other purposes will be apparent from the following description of the preparation and use of the new biologically active compounds.

In copending application, Serial Number 44,890 filed July 25, 1960 and in Serial Number 132,570 filed August 21, 1961, now abandoned, by Victor Mark, there is described a family of halocyclopentadienes which have one or more organic radicals substituted on the cyclopentadiene ring at least one of which is in the allylic position (i.e. on the carbon atom which is not involved in an unsaturated bond). The novel method by which the new compounds are prepared is also claimed therein. These compounds are used in the practice of the present invention and are in accordance therewith adducted to olefins having certain structural configurations.

It is well known that the Diels-Alder adduction involves the reaction of a diene with an unsaturated compound. It is further known that hexachlorocyclopentadienes react in this manner with a wide variety of unsaturated compounds. In accordance with the present invention it has been found that compounds of quite different and valuable properties are prepared by the use of the substituted hexahalocyclopentadienes described in the earlier filed application.

These reactants are represented by the structural formula

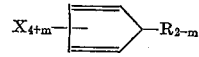

wherein the X's represent halogen atoms of the group consisting of chlorine, bromine, fluorine and iodine; subscript $m$ being an interger from zero (0) to one (1); and wherein each R is a radical selected from the class consisting of hydrocarbon radicals having up to 20 carbon atoms selected from the group consisting of carbon atoms selected from the group consisting of alkyl radicals such as methyl, ethyl, n-propyl, isopropyl, butyl, isobutyl, sec-butyl, tert-butyl, hexyl, 2-ethylhexyl, decyl, dodecyl and octadecyl radicals; alkenyl radicals, such as vinyl, allyl, methallyl, crotyl, 2-hexenyl, 10-undecenyl and 2-hexadecenyl radicals; the alkynyl radicals, such as ethynyl, propargyl, 2-butynyl, 8-decynyl and 2-octadecynyl radicals; the cycloalkyl radicals, such as cyclopropyl, cyclobutyl, cyclopentyl, cyclohexyl, cyclooctyl, norbornyl, tricyclo[2,2,1,0$^{2,6}$]-hept-3-yl and cyclopropylmethyl radicals; the cycloalkenyl radicals, such as 3-cyclopentenyl, 2-cyclohexenyl, 2-cycloheptenyl, cyclooctenyl, 2-norbornen-5-yl, and nopyl radicals; the aryl radicals, such as phenyl, biphenylyl, naphthyl, triphenylmethyl and anthracyl radicals; the alkaryl radicals, such as p-tolyl, 2,4-dimethylphenyl, 7-methyl-1-naphthyl, p-ethylbiphenylyl and 10-ethyl-9-anthracyl radicals; the alkenaryl radicals, such as p-allylphenyl, m-methallylphenyl, p-hexadecenylphenyl and the corresponding substituted naphthyl and biphenyl radicals; the alkyl substituted cycloalkyl radicals, such as 4-dodecylcyclohexyl and the 2-ethylcyclopentyl radicals; the alkenyl substituted cycloalkyl radicals, such as 2-allylcyclopentyl; the alkynyl substituted cycloalkyl radicals such as 4-propargylcyclohexyl, ethylnylcyclopentyl; the alkyl cycloalkenyl radicals, such as 3-ethyl-2-cycloheptenyl; the alkenylcycloalkenyl radicals, such as 4-allyl-2-cyclohexenyl and 4-vinyl-2-cyclohexenyl; the alkynylcycloalkenyl radicals, such as 4-propargyl-2-cyclohexenyl; the aralkyl radicals such as benzyl, 2-phenethyl and indenyl radicals; the aralkenyl radicals, such as cinnamyl and styryl radicals; the aralkynyl radicals, such as 3-phenylpropargyl; the cycloalkyl substituted alkyl, such as 3-cyclohexylpropyl; the cycloalkyl substituted alkenyl radicals, such as 3-cycloheptylallyl, and 3-cyclopentylmethalyl radicals; the cycloalkyl substituted alkynyl radicals such as 3-cyclooctylpropargyl and 10-cyclohexyldecynyl radicals; the cycloalkenylalkyl radicals, such as 2(2-cyclopentenyl)ethyl and (1-cyclohexenyl)methyl; the cycloalkenyl substituted alkenyl radicals, such as 4(1-cyclopentenyl)-2-butenyl and the 2(1-cyclohexenyl)vinyl radicals; the cycloalkenyl substituted alkynyl radicals, such as the 3(2-cyclohexenyl)propargyl radical; the alkyl substituted aralkyl radicals, such as p-ethylbenzyl; the alkenyl substituted aralkyl radicals, such as p-allylphenethyl; the alkynyl substituted aralkyl radicals, such as 10(p-propargylphenyl)decyl; the alkyl substituted aralkenyl radicals, such as 2,4-dimethylcinnamyl; the alkenyl substituted aralkenyl radicals, such as the p-allylstyryl radicals; and the said hydrocarbon radicals containing substituents of the group consisting of chlorine, as in 2-chloroethyl and p-chlorobenzyl; bromine, as in 4-bromobutyl; fluorine, as in 2,2,2-trifluoroethyl; iodine, such as in 2,4,6-tri-iodobenzyl; alkoxy, such as in 2-methoxyethyl and p-isopropoxybenzyl; aryloxy, such as in 2-phenoxyethyl and p-methoxybenzyl; nitro, such as in o-nitrobenzyl; cyano, such as in 2-cyanoethyl; thiocyano, such as in 3-thiocyanoallyl; isocyano, such as in m-isocyanophenyl; mercapto, such as in p-mercaptobenzyl; hydroxyl, such as in 3-hydroxypropyl; acyloxy, such as o-acetyloxybenzyl; isothiocyano, such as in 2-isothiocyanoethyl; acyl, such as in p-acetylphenyl; hydrocarbonoxy carbonyl, such as the methyl ester of p-carboxybenzyl; the alkylthio, such as 2-methylthiopropyl; arylthio, such as in phenylthiomethyl; aralkylthio, such as in 2-benzylthioethyl; amino, such as in 2-aminoethyl; hydrocarbon amino, such as in 2-dimethylaminoethyl; hydrocarbon sulfonyl, such as in 2-isopropylsulfonylethyl; hydrocarbon sulfinyl, such as in 2-phenylsulfinylethyl; furyl, such as in furfuryl; thienyl, such as in thenyl; pyridyl, such as in 2-pyridylethyl; piperidyl, such as in 4-piperidyl; glycidyl, such as in glycidyl and glycidylmethyl; morpholyl, such as in 2(2-morpholyl)ethyl; tetrahydrofuryl, such as in tetrahydrofurfuryl; dihydrofuryl, such as dihydrofurfuryl; tetrahydrothienyl, such as tetrahydrothenyl; dihydrothenyl, such as in dihydrothenyl; the hydrocarbon and acyl groups of the said substituents having up to 20 carbon atoms.

This invention involves the adduction of the above identified polyhalocyclopentadienes with organic compounds containing carbon to carbon unsaturated bonds, hereinafter designated as the dienophiles, said polyhalocyclopentadienes having at least one organic radical on the allylic carbon atom (one that is not involved in a carbon to carbon double bond). The halogen substituents on the polyhalocyclopentadiene may be chlorine, bromine, fluorine, or iodine and may be the same or different halogen atoms on the cyclopentadiene molecule.

The conditions of reaction between the described cyclopentadienes and the dienophiles are dependent upon the nature and relative reactivity of the reactants. The reaction may be conducted at room temperature and atmospheric pressures, but a wide range of conditions is practicable, usually higher than room temperatures, and often higher than atmospheric pressure are required with most reactants.

When the dienophile is very reactive, the simple mixing of the reactants at or below room temperature initiates the reaction. Cooling is then necessary to keep the reactants in liquid form and within the temperature range desired for optimum conversion. It is convenient often to confine the reaction mixture in a closed system to prevent the escape of the volatile component. The use of closed vessels (autoclaves) is especially desirable when the dienophile is gaseous at room temperature. Furthermore, when the reaction partners do not readily interact, the application of heating may be desirable to increase the rate of adduction; this often is done in autoclaves and under autogenous pressures.

The reaction often is conducted in the presence of appropriate solvents. These may have multiple beneficial effects. For instance, a liquid with good solvent properties for the less soluble component might increase the effective concentration, and the rate of the reaction. A liquid often is used when an internal coolant is needed to keep the temperature within a narrow range. By choosing a liquid with a boiling point close to the temperature required for the reaction, the danger of overheating is greatly reduced because the refluxing liquid dissipates the heat of the reaction. Suitable inert solvents are hydrocarbons (benzene, toluene), ethers, halogenated solvents, (chlorobenzene) and the like.

The use of catalysts is ofen desirable in order to speed up the rate of conversion of sluggish reactants. Lewis acids, such as those used in the Friedel-Crafts reaction, are especially useful catalysts. These includes $AlCl_3$, $BF_3$, $SbCl_3$, $FeCl_3$, etc.

Further details in the preparation and use of the new compounds are set forth hereinafter in specific examples.

A novel class of adducts of alkylated halocyclopentadienes is that prepared by adduction with a compound having two unsaturated bonds which may be either ethylenic or acetylenic multiple bonds. These are represented generically by the structure:

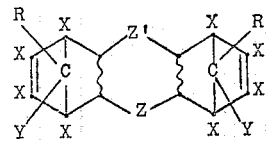

wherein X is a halogen atom, for example chlorine, bromine, iodine and fluorine; wherein R may be any organic hydrocarbon or substituted hydrocarbon radical as above described; wherein Y is selected from the class consisting of R and X; wherein Z and Z' may be single valence bonds, divalent hydrocarbon radicals, non-hydrocarbon hetero groups, or organic radicals containing hetero groups.

The novel class of compounds are prepared by adducting two molecular proportions of the halogenated organic substituted cyclopentadiene with one molecular proportion of a cyclic organic compound containing two unsaturated carbon to carbon bonds. Suitable bis-unsaturated compounds are furan, pyran, thiophene, the cyclohexadienes, cyclopentadiene, the cyclooctadienes, pyrone, coumalin, and other cyclic organic compounds with at least two double bonds, comprising naphthalene, phenanthrene and higher polycyclic aromatic compounds.

A preferred group of the novel compounds is that of the formula

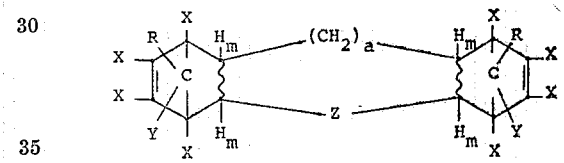

wherein R is selected from the class consisting of alkyl radicals of up to eight carbon atoms, the alkenyl radicals of up to eight carbon atoms, the oxaalkyl radicals of up to eight carbon atoms and the chloroalkyl radicals of up to eight carbon atoms and with the alpha carbon atom free of chlorine substituents; wherein X is selected from the class consisting of chlorine and bromine; wherein $a$ is an integer from zero to three; wherein $m$ has the value zero or one; and Z is selected from the group consisting of —O—, —S—, —$(CH_2)_b$— in which $b$ is an integer from zero to three.

Further details are set forth in the following examples.

EXAMPLE 1

Two mol proportions of 1,2,3,4,5-pentachloro-5-isopropylcyclopentadiene and one mole of furan was charged to a closed vessel and heated in an oil bath (150° C.) for six hours. The product formed had the structure.

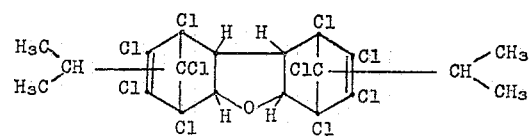

EXAMPLE 2

The procedure of Example 1 was repeated except that thiophene was substituted for the furan. The following compound was thereby synthesized:

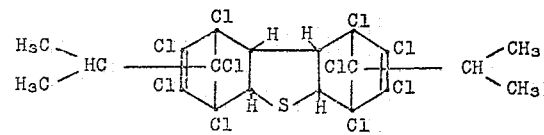

EXAMPLE 3

The adduction reaction of 1,4-cyclohexadiene with two molecular equivalents of 1,2,3,4,5-pentabromo-5-t-isobutylcyclopentadiene was effected by heating the mixture of the reagents at the reflux temperature until the following compound was formed:

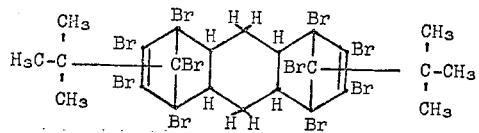

EXAMPLE 4

The procedure of Example 3 was repeated except that 1,5-cyclooctadiene and 1,2,3,4,5-pentachloro-5-(3-methoxypropyl)cyclopentadiene were used as reactants. The following compound was recovered from the reaction mixture:

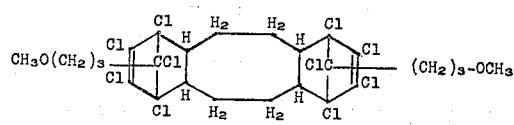

EXAMPLE 5

The adduction of γ-pyran with 2 mols of 1,2,3,4,5-pentachloro-5-allylcyclopentadiene by the procedure of Example 1 synthesized the following compound:

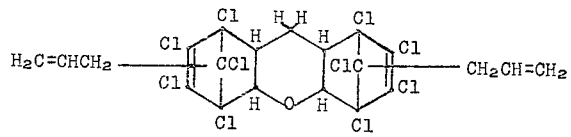

EXAMPLE 6

Naphthalene was adducted with two mols of 1,2,3,4,5-pentachloro-5-(6-choloro-n-hexyl)cyclopentadiene by the procedure of Example 4 to obtain a product with the structure:

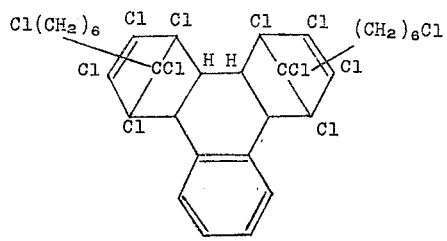

EXAMPLE 7

Using the procedure of Example 1, 1,2,3,4-tetrachloro-5,5-dimethylcyclopentadiene was adducted with cyclopentadiene to produce a compound with the structure:

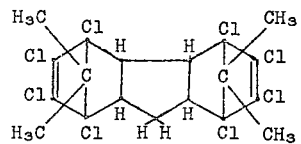

EXAMPLE 8

By heating together 2,5-norbornadiene and 1,2,3,4,5-pentachloro-5-ethylcyclopentadiene in a 1:2 ratio at 150–160° C., a compound, M.P. 198–201° C., was obtained with the following structure:

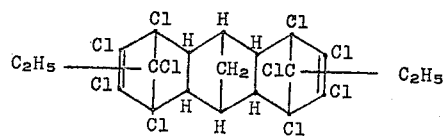

The above examples represent preferred modifications of the invention and these will suggest further variations to one skilled in the art. Similarly, the following claims are directed to more useful modifications of the invention, but other compounds of the claims defined broadly will have similar utility.

What is claimed is:

1. A compound of the formula:

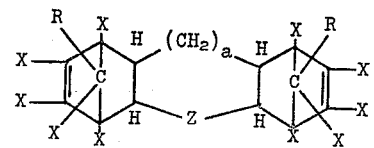

wherein R is a hydrocarbyl group, having a maximum of 8 carbon atoms, selected from the group consisting of alkyl, alkenyl, oxaalkyl and chloroalkyl, said chloroalkyl having an alpha carbon free of halogen substituents; X is a halogen atom selected from the group consisting of chlorine and bromine; Z is selected from the group consisting of —O—, —S—, and —(CH$_2$)$_b$— in which $b$ is an integer from one to three; and $a$ is an integer from zero to three.

2. A compound, in accordance with claim 1, of the formula:

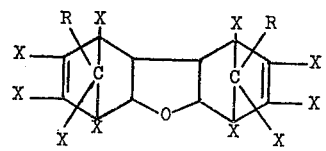

3. A compound, in accordance with claim 1, of the formula:

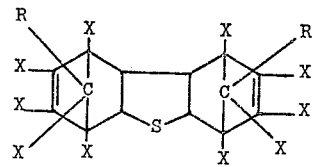

4. A compound, in accordance with claim 1, of the formula:

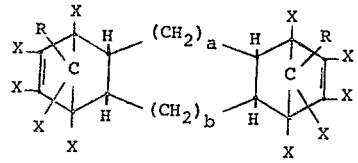

wherein $a$ is one of the integers zero to three and $b$ is one of the integers 1, 2, 3.

5. A compound in accordance with claim 4 in which $a$ is one and $b$ is one of the integers 1, 2 and 3.

6. A compound in accordance with claim 4 in which $a$ is two and $b$ is one of the integers 2 and 3.

7. A compound in accordance with claim 4 in which $a$ and $b$ are both three.

8. A compound of the structure

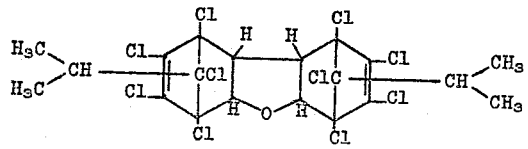

9. A compound of the structure

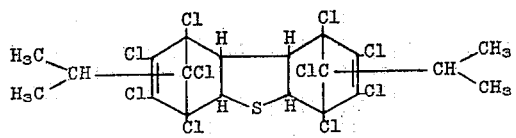

10. A compound of the structure

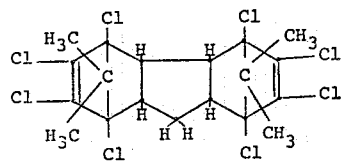

11. A compound of the structure

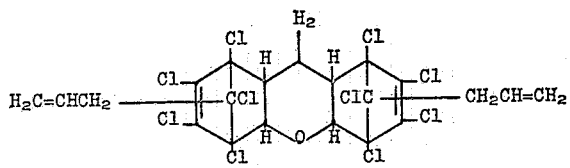

12. A compound of the structure

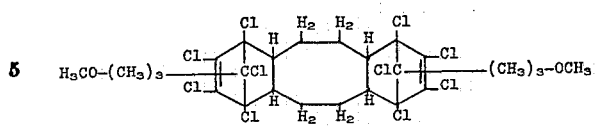

13. A compound in accordance with claim 4, in which $a$ is zero and $b$ is one of the integers 1, 2 and 3.

References Cited

UNITED STATES PATENTS

| | | | |
|---|---|---|---|
| 2,635,977 | 4/1953 | Lidov | 167—30 |
| 2,676,132 | 4/1954 | Bluestone | 167—33 |
| 2,697,103 | 12/1954 | Ordas | 260—346.6 |

OTHER REFERENCES

Peri Chemical Abstracts, vol. 50 (1956), pp. 10013–5.

WALTER A. MODANCE, *Primary Examiner.*

J. PATTEN, *Examiner.*